(12) United States Patent
Bryan et al.

(10) Patent No.: US 7,322,384 B2
(45) Date of Patent: *Jan. 29, 2008

(54) HAZARDOUS FLUIDS TRANSFER SYSTEM AND METHOD

(75) Inventors: Avron L. Bryan, Cocoa Beach, FL (US); Larry D. Heller, Osteen, FL (US)

(73) Assignee: Adapco, Inc., Sanford, FL (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/059,578

(22) Filed: Feb. 16, 2005

(65) Prior Publication Data

US 2005/0189036 A1    Sep. 1, 2005

Related U.S. Application Data

(63) Continuation-in-part of application No. 10/752,214, filed on Jan. 6, 2004, now Pat. No. 6,968,871, which is a continuation of application No. 10/032,367, filed on Dec. 8, 2001, now Pat. No. 6,698,461.

(60) Provisional application No. 60/545,095, filed on Feb. 17, 2004, provisional application No. 60/256,718, filed on Dec. 19, 2000.

(51) Int. Cl.
*B65B 31/00* (2006.01)

(52) U.S. Cl. .......................... 141/59; 141/49; 141/94; 141/285; 141/301

(58) Field of Classification Search .................... 141/1, 141/4–9, 18, 37, 47, 49, 59, 65, 67, 83, 94, 141/95, 100–105, 192, 198, 285, 301
See application file for complete search history.

(56) References Cited

U.S. PATENT DOCUMENTS

| | | |
|---|---|---|
| 3,863,687 A | 2/1975 | Alquist |
| 3,905,405 A | 9/1975 | Fowler et al. |
| 3,981,334 A | 9/1976 | Deters |
| 4,254,805 A | 3/1981 | Reeder |
| 4,310,033 A | 1/1982 | Deters |
| 4,344,469 A | 8/1982 | Brown |
| 5,367,882 A | 11/1994 | Lievens et al. |
| 5,411,374 A * | 5/1995 | Gram .......................... 417/53 |
| 5,450,883 A * | 9/1995 | Payne et al. .................. 141/59 |
| 5,484,000 A | 1/1996 | Hasselmann |
| 5,490,387 A | 2/1996 | Bisson et al. |
| RE35,238 E | 5/1996 | Pope |

(Continued)

*Primary Examiner*—Timothy L. Maust
(74) *Attorney, Agent, or Firm*—Allen, Dyer, Doppelt, Milbrath & Gilchrist, P.A.

(57) ABSTRACT

A hazardous fluid transfer system is automated for controlling transfer of hazardous fluid within a closed environment thus providing protection to an operator handling the transfer. The hazardous fluid is transferred from a source container to a target container using a processor controlled pump responsive to flow and pressure within a liquid line. A pre-programmed processor receives pressure and flow signals from transducers monitoring the liquid line. The processor actuates a valve within a vapor line between the source and target containers in response to pressure within the target container. The valve is opened for allowing vapor to accumulate within an accumulator during a filling of the target container and closed for causing the accumulator to force vapor stored in the accumulator into the source container, thus transferring the liquid from the source container to the target container while maintaining fluid transfer within the closed environment.

24 Claims, 9 Drawing Sheets

U.S. PATENT DOCUMENTS

| | | |
|---|---|---|
| 5,878,792 A | 3/1999 | Pettazzoni et al. |
| 6,231,009 B1 | 5/2001 | Kong |
| 6,336,479 B1 * | 1/2002 | Nanaji ............................ 141/4 |
| 6,499,516 B2 * | 12/2002 | Pope et al. .................... 141/59 |
| 6,698,461 B1 | 3/2004 | Bryan et al. |
| 6,834,686 B2 | 12/2004 | Gray et al. |
| 6,968,871 B2 * | 11/2005 | Bryan et al. ................... 141/94 |
| 2004/0031538 A1 | 2/2004 | Richard et al. |
| 2004/0194851 A1 | 10/2004 | Bryan et al. |

* cited by examiner

HAZARDOUS FLUIDS TRANSFER SYSTEM AND METHOD

CROSS-REFERENCE TO RELATED APPLICATIONS

This application claims priority to Provisional Patent Application Ser. No. 60/545,095 for "Hazardous Materials Transfer System and Method" having filing date Feb. 17, 2004 and is a continuation-in-part of U.S. application Ser. No. 10/752,214 having filing date Jan. 6, 2004, now U.S. Pat. No. 6,968,871 which itself is a continuation of U.S. application Ser.No. 10/032,367, filed Dec. 18, 2001, now U.S. Pat. No. 6,698,461 which claims the benefit of U.S. Provisional Application No. 60/256,718, filed Dec. 19, 2000, the disclosures of which are hereby incorporated herein by reference in their entireties, and all commonly owned.

FIELD OF THE INVENTION

The invention relates generally to the transfer of hazardous materials, and more particularly to a method of transferring hazardous fluids, including liquids and vapors, within an environmentally closed system for protecting the health and well being of personnel responsible for the fluid transfer.

BACKGROUND OF THE INVENTION

The transfer of hazardous fluids is known to present potential problems to both the environment within which the hazardous fluids are being used, and to the user responsible for handling the fluids. There is a particular need to control such transfer of hazardous fluids without an undue reliance on the skill or training of the personnel handling the fluids. It would be preferable is such transfer could be an easy as filling ones gas tank at a self-service gas station, and in particular not require cumbersome and expensive protective wear. There is further a need handle such hazardous fluids while protecting the environment.

SUMMARY

The present invention, herein described and embodied in a fluids transfer system and method, includes an automated system useful in mosquito control, by way of example, for transferring hazardous chemicals from a chemical storage tank to a tank on board a vehicle or aircraft from which the chemicals will be distributed. The chemicals transferred using the system and method of the present invention remain within a closed (gas sealed) environment for providing maximum personal protection to a user during a transfer operation.

Embodiments of the present invention prevent the hazardous materials, both liquids and gases, from escaping into the environment. As a result, there is no need for personnel protective suits or re-breathing equipment, and the possible exposure to the chemical is still dramatically reduced. The present invention provides a mixing capability at varying ratios as well as safely transfer the hazardous material.

An automated system, as herein described by way of example, is useful for mosquito control personnel required to transfer and/or mix harsh chemical materials with a diluent from a chemical materials storage drum to a storage tank on board a vehicle or aircraft. Embodiment of the present invention, as herein described, provide closed systems for providing personal protection.

A fluid materials transfer system in keeping with the teachings of the present invention for transferring hazardous fluids from a source to a target while maintaining the fluid materials within a closed environment in order to provide the maximum personal protection to the user during a transfer operation may comprise a storage container for storing a fluid within the closed environment, a flow controller operable for delivering a fluid from a source location to the storage container while maintaining the fluid within the closed environment, a sensor for sensing an amount of fluid carried by the storage container, and a processor operable with the flow controller for controlling flows therewith in response to an amount of fluid sensed by the sensor.

One embodiment may comprise a source storage container for carrying a hazardous fluid and a target storage container for receiving the hazardous fluid. A liquid conduit may be connected between the source storage container and the target storage container for delivering a liquid therebetween. A vapor conduit may be connected between the source storage container and the target storage container for delivering a vapor therebetween, wherein the liquid and the vapor are segregated during delivery between the source storage and the target storage containers. A pump may be operable with the liquid conduit for pumping the liquid from the source storage container to the target storage container during actuation of the pump. A flow sensor may be operable with the liquid conduit for monitoring flow in the liquid conduit. A first pressure sensor may be operable with the liquid conduit for monitoring pressure in a portion of the liquid conduit between the pump and the target storage container. A valve may be operable with the vapor conduit for controlling vapor flow through the vapor conduit. A second pressure sensor may be operable with the vapor conduit for monitoring pressure in a portion of the vapor conduit between the valve and the target storage container. A vapor accumulator may be operable in a portion of the vapor conduit between the valve and the source storage container for accumulating vapor during periods when the valve is in on open position and forcing the accumulated vapor into the source storage container during periods when the valve is in a closed position. A controller is operable for receiving input signals from the sensors and automatically actuating the pump responsive to pressure within the liquid conduit and automatically actuating the valve responsive to a preselected pressure level established for the target storage container.

A method aspect of the invention includes transferring hazardous fluids from a source to a target while maintaining the fluid materials within a closed environment in order to provide the maximum personal protection to the user during a transfer operation comprising storing a fluid within a closed environment, delivering the fluid from the source location while maintaining the fluid within the closed environment, sensing an amount of fluid transferred, delivering a controlled amount of the fluid to a target location while maintaining the fluid within the closed environment, and controlling the delivering of the fluid from the source location to the target location in response to the sensing of an amount of fluid being stored.

Yet another method aspect of the invention for transferring a hazardous fluid within a closed environment may include providing a sealed connection between a source container having a liquid stored therein and a target container to which the liquid is to be transferred. The sealed connection includes a liquid conduit and a separate vapor conduit. The liquid is pumped from the source container to the target container using the liquid conduit. Vapor accumulating in the target container is vented to the source container using the vapor conduit. As the liquid is being pumped, vapor is collected in an expandable accumulator connected within the vapor conduit. At preselected intervals, vapor flow from the target container is stopped using a valve. With the vapor flow from the target container stopped, the vapor collected in the accumulator is forced into the source container through the continued action of he liquid pumping. Liquid flow and pressure are monitored for controlling the pumping. Pressure within the target container is monitored for determining intervals of vapor flow from the accumulator to the source container. A controller may be used with the monitoring and controlling of the pumping and vapor flow.

BRIEF DESCRIPTION OF THE DRAWINGS

Embodiments of the invention are described by way of example with reference to the accompanying drawings in which.

DETAILED DESCRIPTION OF THE PREFERRED EMBODIMENTS

The present invention will now be described more fully hereinafter with reference to the accompanying drawings, in which embodiments of the present invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
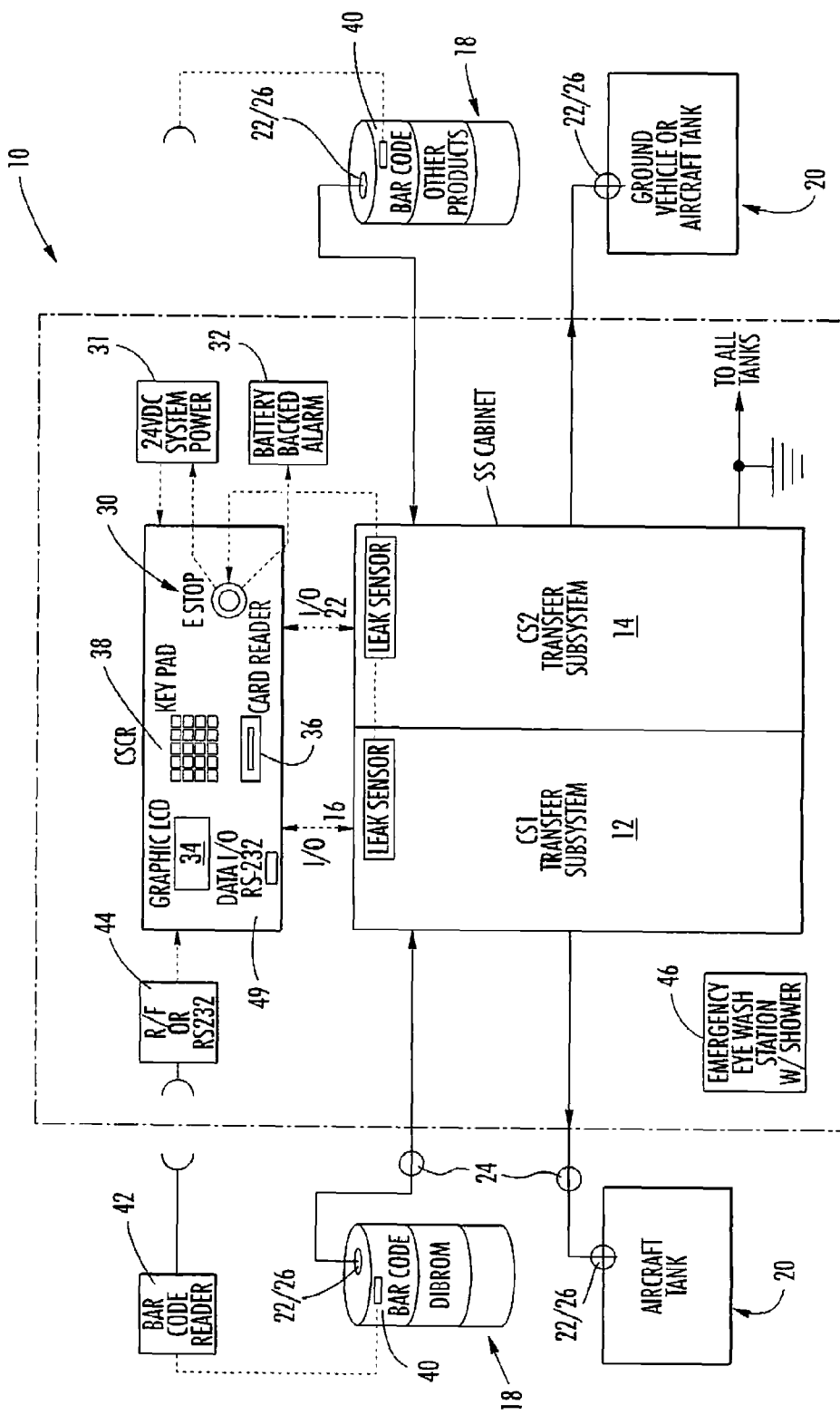
FIG. 1 is a block diagram illustrating an embodiment of the present invention including a closed system for the mixing and transfer of chemicals.

With reference initially to FIG. 1, the system 10 illustrative of the present invention and herein described by way of example, includes a first subsystem 12 for illustrating a transfer of a highly hazardous material such as Dibrom (dibromochloropropane-a colorless, halogenated, carcinogenic hydrocarbon used as a pesticide, fumigant, and nematocide, and restricted in usage), a second subsystem 14 for illustrating a mixing and transferring of environmentally harmful materials, by way of example, and a controller 16 operable with both subsystems for controlling the transfer of the materials to be handled and keeping a record thereof. Expanded details of each will be addressed with reference to FIGS. 2-4. It is expected that the first subsystem (CS1) 12 will use Teflon fittings and other special processing components (pumps and valves) to handle the Dibrom product. The second subsystem (CS2) 14 will have additional components to provide for the mixing process with oil or water as may be required by the particular chemical material for the pre-selected use.

With continued reference to FIG. 1, consider the mechanical aspects of the present invention with reference to those needs known in the mosquito control industry. The embodiments illustrated with reference to the accompanying drawings accommodate the transfer of chemical materials from source tanks 18 such as 30, 55, or 275-gallon drums or bulk containers. Elements herein described for the embodiments illustrated, such as closed connectors may be selected from trusted and reliable manufacturers, and are herein presented are for illustrative purposes. Continuing with the example for mosquito control, a target tank 20 in the transfer may include a chemical container to be transported onboard a vehicle, such as a pickup truck, which truck may be part of the system of the present invention. This target tank 20 will likely have a 15-20 gallon capacity, be UV resistant, and preferably be manufactured from a high-density polyethylene. Typically, larger containers will the target tank 20 when used on an aircraft from which the chemical will be spread.

Some chemical materials (chemicals) planned for use may require mixing with a diluent, such as a light oil or water. Mixing ratios may typically range from 4:1 to approximately 15:1 and may be either mechanically adjusted or logic controlled. Generally, most chemicals used in mosquito control will not require mixing and are known generally known as ready-to-use (RTU) chemicals. As will be described in more detail later in this section, a connector 22 on a vehicle container will be sealed while connected or unconnected to any supply line 24. The connector 26 on the supply line 24 is also sealed to prevent leaks while unconnected. As is described more fully with reference to FIGS. 2 and 3A, 3B, and 3C, the supply hose 28 connected to the vehicle is preferably not pressurized while not in use. Transfer times may range from approximately 5 gallons per minute for ground vehicles to about 20 gallons per minute for aircraft. Any system component contacting the chemical must be compatible with the harsh, corrosive mosquito control chemicals, such as Dibrom, by way of example. A Material Safety Data Sheet (MSDS) for Dibrom will be provided as well as material compatibility from AMVAC, the manufacturer of the chemical. Baytex and Fyfanon are other chemicals known to be corrosive and hazardous, thus requiring care when handling. The system 10 will automatically stop the transfer of the chemical materials when the target tank 20 is full. The system 10 as illustrated with reference again to FIG. 1, with further details illustrated in FIG. 4, includes a manually operated emergency stop button 30 which when activated will cause an override any automatically operated stop or start control. The emergency stop button 30 for the transfer process is mounted on a user interface panel of the controller 16. The stop button removes the 24 volt system power 31 supplied, thus stopping all operations after emergency stop flow valves have been activated, which valves are described later in further detail with reference to FIGS. 2 and 3A, 3B, and 3C. The system 10 will capture or re-circulate any vapor generated by the chemical materials during transfer. Also, an alarm 48 is activated which is separately battery powered.

With reference again to FIG. 1 and specifically the controller 16, consider the intelligence and control aspects of the present invention. The system 10 controls flow of the chemical materials and meters its presence within a closed loop. The controller 16 controls and records the operation and data collection for both the first subsystem (CS1) 12 and the second subsystem (CS2) 14. Individually controlled operation is preferred, but the system 10 and its controller 16 may not be limited to an individual or a simultaneous control of both subsystems, which control will depend on the operation and the support personal. Therefore, one subsystem, dual subsystems, two distinct subsystems, or any combination will be selected by a used to meet the need.

By way of example, the metering method as herein described includes use of weighing devices such as load cells 33, as will be further described and illustrated with reference to FIGS. 2 and 3A, 3B, and 3C, but it is expected that other methods and devices, such as in-line metering will be used by those of skill in the art now having the benefit of the teachings of the present invention. Flow data is stored in a computer memory, and data reporting may include but is not limited to total chemical material per vehicle, date and time chemical material was transferred, person performing the transfer, vehicle number, type of chemical material transferred, total amount of chemical material used per day, and the cumulative total. A graphic display 34 is provided. Password entry or card reader 36 data entry will be required for access to the controls. In addition, a keypad 38 is provided for data entry for the embodiment herein described. Desired amounts of material to be transferred will be programmed, and an automatic shut-off provided as an override. The graphic (LCD) display 34 and the keypad 38 to enable user commands to the system 10 and the ability to view data relating to the transfer process. Reports on the transfer process are available via an RS232 connection port either in real-time or as a call up report.

As above described, the present invention provides for chemical materials transfer while providing personnel and environmental protection. As herein presented, by way of example, for the hazardous material Dibrom, and for certain other mosquito insecticide materials, the standalone first subsystem (CS1) 12 may be required, and will need to be dedicated to that specific chemical material or product throughout its use, or until thoroughly cleaned. With such a requirement, a separate standalone subsystem, such as the second subsystem (CS2) 14 will be used to transfer, or mix and transfer, all other chemical materials for the mosquito insecticides anticipated for the example herein described. Again, it is anticipated that various alternatives, combinations and sub-combinations of the embodiments herein presented by way of example, will be developed now having the benefit of the teachings of the present invention.

With reference again to FIG. 1, the source tanks 18 carrying a supply of insecticide carry a bar code ID strip 40. The bar code strip 40 is read by a bar code reader 42, which also transmits the data to the controller 16 via an RF signaling unit 44. This will permit identifying that the source (supply) tank 18 is carrying an acceptable product. The controller algorithm will utilize known bar code data provided by a supplier, a customer identification number, and chemical utilization data for the particular source tank to qualify that source tank as being acceptable for use. Provisions for the bar code reader 42 are included in the controller 16. As a further safety consideration, a shower and eye wash station 46 is provided as a part of the system 10. An RS232 connection 48 is also used as will be described later in further detail.

The controller 16 includes numerous inputs and outputs (I/O) to each subsystem 12, 14 for an operator interface, the bar code reader 42 and the RS-232 serial port 49. By way of example, the second subsystem 14 illustrated with reference to FIGS. 3A, 3B, and 3C, will have I/O which will include: six 4-20 mA inputs from the load cell summations, differential pressure sensor, and the pressure transducer to the A/D on the system; two pulse width modulated (PWM) signals at 24 volts from the system 14 to pumps P2 and P4 pumps; and two logic 5 volt signals to the controller 16; and ten 24 volt control commands from the controller 16 to the subsystem 14.

The first subsystem 12 will have direct I/O which include: two 4-20 mA inputs from the load cell summations, pressure transducer to an A/D converter for the controller 16; one 24 volt PWM signal to a pump (P2); three logic 5 volt signals to the controller 16; and six 24 volt control signal commands from the controller 16 to the first subsystem (CS1) 12.

With reference again to FIG. 4, and by way of example, a processor 17, including a TDS2020 and a Mother Board with I2C paths can satisfy these I/O requirements. Therefore, while one may prefer using a dual TDS2020 implementation based on desired control, one is probably not required.

Consider the operation of the first subsystem 12 with reference again to FIG. 2. The chemical material being used is Dibrom, a corrosive insecticide in a liquid form carried in the source tank 18. A dry connector (manufactured by Micro-Matic) is used for the connection 22/26, as earlier described with reference to FIG. 1, to this mosquito control chemical source. The chemical material transfer flow process is automatic and is controlled by the controller 16, after the desired start data have been entered through the keypad 38, by way of example. Transfer process feedback is achieved by reading data from the sensors and process hardware control is via on/off switches at 5 volts, 24 volts or PWM signals to pumps, as illustrated with reference to FIG. 4.

Figure 2:
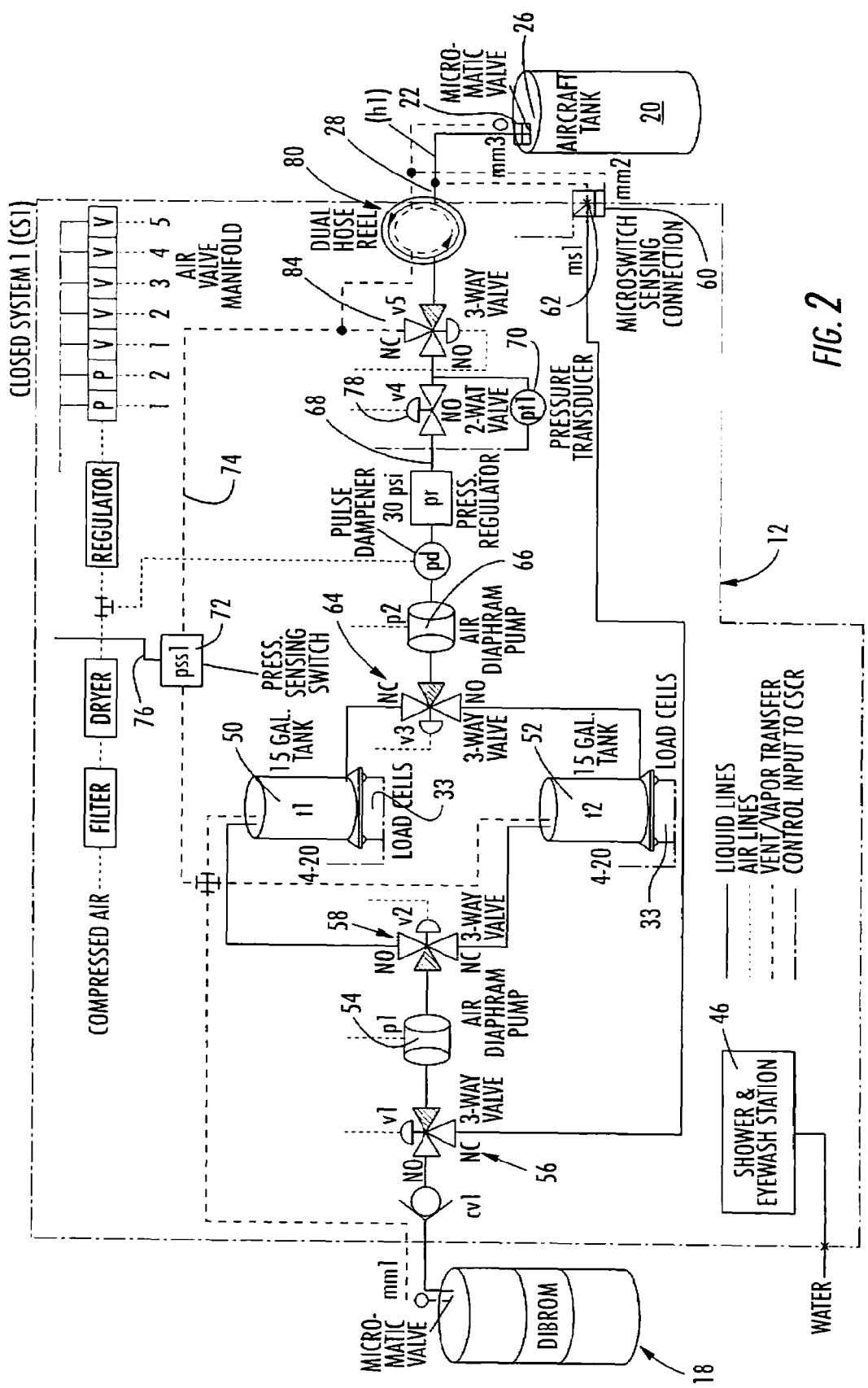
FIG. 2 is a block diagram of an embodiment of the present invention illustrating elements used for transfer of a hazardous chemical material from a source to a target tank.
Figure 4:
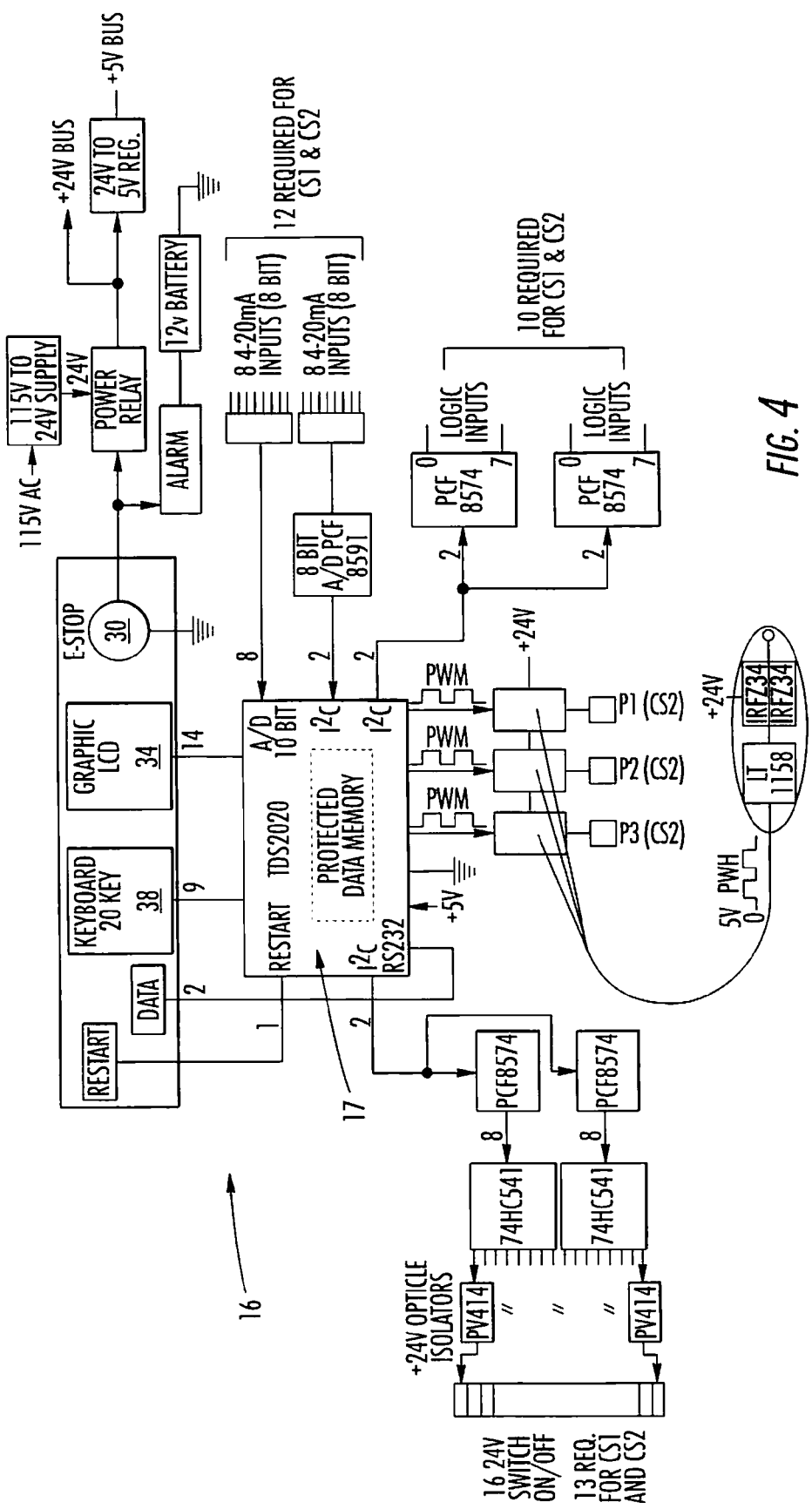
FIG. 4 is a block diagram illustrating one system controller operable with the embodiments of FIGS. 1-3.

The measurement accuracy of the total chemical transferred will depend upon the accuracy of the load cells 33 on the first and second tanks 50, 52 (also identified in FIG. 2 as t1 and t2). The error in measurement will be less than 2%. The transfer of chemical materials using the first subsystem 12 will assume that the requirement includes transferring the Dibrom from the source tank 18 to the target tank 20 without a need for mixing, unlike the example described with reference to FIG. 4 illustrating the second subsystem 14. The sequential process steps for the insecticide chemical transfer from the source tank 18 to the target tank 20 located on an aircraft will be as follows:

The controller 16 described earlier with reference to FIGS. 1 and 4, verifies at an initial time (time #0) that the first tank (t1) 50 and the second tank (t2) 52 are at a "full" level. If the first tank 50 is not full, a first pump (p1) 54 is switched on. If the first tank 50 is such that its level does not increase, a message is displayed with instruction to change the source tank 18. If the first tank 50 is full but the second tank 52 is not, a diverter styled valve (v1), a first valve 56 is held in its normally open (NO) position allowing the first pump 54 to be switched on for filling the second tank 52 through the normally open second diverter valve (v2) 58. If the fluid level in the second tank 52 still does not increase, a message is again displayed to change source tank 18.

The controller 16 verifies at a later time (time #1) that the supply hose 24 at location (h1) is attached to a receptacle/connector 60 by checking the status of micro switch (ms1) 62. The micro switch 62 must be closed to begin user keypad interface operation. The controller 16 will switch valve (v3) 64 allow flow to the first tank 50 and the first valve 56 and the first pump (p1) 54 and second pump (p2) 66 to wet the system flow lines 68 to be ready for connection to the target tank 20.

After a predetermined wetting time, the first valve (v1) 56 is turned off and pressure is delivered to the system lines 68 until it is measured at approximately 30 PSI, by way of example, and indicated by a signal from a pressure transducer (pt1) 70. The controller 16 will then turn off the first valve 56 and the first (p1) and second (p2) pumps 54, 66.

The controller 16 will then display a message to disconnect the hose 28 at the connector (mm2) 60 and connect the hose connector 22 to the target tank connector (mm3) 26.

Once the hose 28 is connected at (mm3) to the target tank 20, the controller will sense a pressure drop at the transducer (pt1) 70 indicating that the system line 68 has been connected. The transfer and filling process can then start.

The controller 16 then takes the preset conditions (GPM and pre-programmed total), initiating the fill cycle. During this fill cycle, the material/product (e.g. Dibrom) is first transferred from the first tank 50 (t1) to the target tank 20. If more product is needed to complete the fill cycle, flow from the second tank 52 (t2) will be switched by the controller 16 using the third switching valve 64 (v3) to the second tank (t2) and refilling the first tank (t1) by second switching valve 58 (v2) to the first tank 50 (t1) and also turning on the first pump 54 (p1). The controller 16 will check the weight of the first tank 50 using a signal from the load cell 33 until a full condition indication has been met. The controller will then turn the first pump 54 (p1) off, while metering the output of the second tank 52 (t2) using its associated load cell 33, or alternatively by using a flow metering device. If more material is required to complete the filling of the target tank 20, this step is repeated with a toggling between the first and second tanks.

The controller 16 will transfer a pre-programmed quantity of product (Dibrom) to the target tank 20. If the target tank 20 becomes full before the pre-programmed amount, pressure in the target tank will be sensed by a pressure sensing switch (pss1) 72 operable within vent/vapor line 74 of the system 10 for providing a pressure signal to the controller 16 via control input lines 76 lines operable with the controller indicating that the second pump 66 must be turned off and a two-way valve (v4) 78 closed. By way of example, when filling is within 2 gallons of the pre-programmed amount, the controller 16 will taper (slow) the rate of the second pump (p2) 66 output until a desired amount is reached. During the transfer and filling operation, vapor from the target tank 20 is transferred back to the source tank 18 via the line 74 to keep the system 10 closed to the surrounding/outside environment.

Should an emergency condition exist, pressing the large emergency stop button 30 will immediately close the two-way valve (v4) 78 and all operating system components. To restart the system, the emergency stop button 30 must be manually reset as will be indicated by a message from the controller 16.

Operation includes draining the hose 28. Upon completion of the filling of the target tank 20, the controller 16 will display a message "do you want to fill another tank". If your keypad entry is a "no," the controller 16 will display a message to disconnect the connectors 22/26 (mm3) from the target tank 20, retract the hose 28 on its hose reel 80 and connect the hose connector 26 to the connector/receptacle 60 (mm2). If your answer and keypad entry id a "yes," the controller 16 will display message to disconnect connectors 22/26 (mm3) from the target tank 20, retract the hose 28 on the reel 80 to prevent damage to the hose and connector 26, and do not reconnect to the receptacle 60 (mm2). This will leave the system lines 68 wet for filling additional target tanks.

When connecting to (mm2) 60 after filling has been completed, the controller 16 will sense a signal from a micro switch (ms1) 82 indicating a closure and thus indicating that the hose 28 is connected. The controller 16 will then open a fifth valve (v5) 84 (a three-way valve) to provide air into the fluid system lines 68 to prevent hose collapse during drainage. In addition to opening the fifth valve 84(v5), the controller 16 will open the first valve (v1) 56, close the two-way valve (v4) 78 and turn on the first pump (p1) 54. The controller will then make a determination as to which tank, the first(t1) or the second (t2) is to be used for draining the hose 28 and will position the second valve (v2) 58 accordingly for draining the hose based on which tank is less full. This operation will continue until no further material/product is pumped into one of these two tanks as sensed by the corresponding load cells 33.

The last step in this sequence to be performed is to fill both the first (t1) and second (t2) tanks 50, 52. After this final sequence is complete, the computer TDS2020 will go into "sleep mode" after a predetermined time period.

By way of further example and use of alternate embodiments of the present invention, consider an operation of the second subsystem 14 with reference again to FIG. 3 for a use of the invention in mixing and transferring chemical materials within a closed system 11. In the example herein described, liquid inputs to the system 11 are an insecticide chemical carried within the source tank 18 and a dilution chemical, either oil or water (if dilution is required) carried within the dilution tank 86. As earlier described with reference to FIG. 1, dry connectors 22, 26 are used on the source tank 18 with the mosquito chemical.

As earlier described with reference to FIGS. 1 and 2, the chemical materials transfer flow process is automatic and controlled by the controller 16 (after the necessary start data has been entered at the keypad 38). Process feedback is achieved by reading data from the various system sensors and process hardware control is via on/off switches at 5 volts and 24 volts or PWM signals (24 volt) to system pumps. The accuracy of the materials mixing is dependent upon the accuracy of the load cells 33 used. It is expected to be within better than 2%.

The transfer of chemical material from the source tank 18 to the target tank 20 including mixing of the chemical material with a diluent transferred form the dilution tank 86 will assume that a particular mixing of the insecticide and dilution chemical is required. One preferred embodiment of the present invention includes the following sequential process steps for this insecticide chemical transfer from the source tank 18 to the target tank 20, some of which steps may be eliminated depending upon the requirements imposed by the chemicals being transferred and the desires of the user.

As way similarly described for the operation of system 10, with reference to FIG. 2, the controller 18 verifies at an initial time (time #0) that the tank (t1) 50*c* and the tank (t2) 52*c* levels are full. If tank (t1) 50*c* is not full, pump (p1) 54*c* is switched on. If tank (t1) 50*c* levels still do not increase, a message is displayed to change the source tank 18. If tank (t1) 50*c* is full but tank (t2) 52*c* is not, valve (v1) 58*c* and pump (p1) 54*c* are both switched on until a full condition is indicated. If tank (t2) 52*c* levels still do not increase, a message is again displayed to change the source tank 18.

If mixing with a dilution chemical is not required, the controller 16 will not attempt to fill tank (t3) 50*d* and tank (t4) 52d. If mixing is required, the controller 16 will also verify at time (time #0) that tank (t3) 50d and tank (t4) 52d levels are full. If tank (t3) 50d is not full, pump (p3) 54d is switched on. If tank (t3) 50d levels still do not increase, a message is displayed to change the dilution tank 86. If tank (t3) 50d is full but tank (t4) 52d is not, valve (v4) 58d and pump (p3) 54d are both switched on until the controller 16 receives a sensing signal indicating a full condition. If tank (t4) 52d levels do not rise at any time during this sequence, a message is displayed to change the dilution tank 86.

The controller 16 verifies at time (time#1) that the hose (h1) 28 is attached to the receptacle (mm2) 60, as earlier described with reference to FIG. 2, by checking the status of micro switch (ms1) 62, which micro switch (ms1) must be closed to begin user keypad interface operation. The controller 16 will switch on valve (v2) 64c and valve (v5) 64d as well as pumps (p2) 66c and (p4) 66d at preferably low flow rates, and switch a transfer pump (p5) 88 on and off until a fifth tank (t5) 90 within this mixing system 11 is full. A tank level sensor (tsf) 92 signals the controller 16 that the tank (t5) 90 is full. The controller 16 will then turn off pump (p5) 88 and close a valve (v9) 94 located between the tank 90 and the pump 88 connected to the receptacle/connector 60. The controller will then turn off pump (p2) 66c & pump (p4) 66d when a pressure transducer (pt1) operable within the system line indicates 30 PSI. This sequence indicates that the system 11 is within a wet condition.

The controller 16 will then display a message to disconnect the hose (h1) 28 at the connector (mm2) 60 and connect the hose connector 26 to the target tank connector (mm3) 22.

Once the hose 28 has been connected using the connectors (mm3) 22/26 to the target tank 20, the controller 16 will receive a signal from the pressure sensor indicating a pressure drop at (pt1) indicating that the system 11 is closed, properly connected, and ready to start the filling process.

The controller 16 will now take the preset conditions and programmed requirements (GPM, mix ratio, pre-programmed total, and the like) and will initiate the transfer and filling cycle.

In the way of providing further example with regard to using the system 11 without mixing, such as is known for RTU products, the controller 16 will first open valve (v6) 98, close valve (v5) 64d and turn on pump (p4) 66d until a tank level empty signal from level sensor (tse) 100 is indicated in tank (t5) 90. In this embodiment, once the +5 volt signal has been sensed from the (tse) sensor 100, the controller 16 will close valve (v6) 98, and turn off pump (p4) 66d. During this fill cycle, product is transferred from tank (t1) 50c first to the target tank 20. The controller 16 will turn on pump (p2) 66c and open valve (v2) 64c. If additional product is needed to complete the filling cycle, and tank (t1) 50c is empty, tank (t2) 52c will be used by the controller 16 switching valve (v2) 64c to tank (t2) 52c and valve (v1) 58c and pump (p1) 54c to refill tank (t1) 50c. The controller 16 will check the weight of tank (t1) 50c until a full indication has been met, then turn pump (p1) 54c off, while metering the output of tank (t2) 52c. If yet additional product is required to complete the filling of the target tank 20, this step is repeated, toggling between the two tanks 50c, 52c.

Consider the mixing of the chemical material with diluent, keeping in mind that while a liquid is used herein by way of example for the mosquito control industry, it is anticipated that any fluid, including beads by way of example, may be used in the transfer now having the benefit of the teachings of the present invention. This step including a mixing is as previously described except that both are accomplished simultaneously. It is to be noted that when a three-way manually operated valve, valve (v3) 102 is used to select between oil or water dilutions, the controller 16 will display a message to check the manual position of this valve accordingly. This sequence will be the same as that described for the RTU but with different components designated to complete the task, as will herein be described. The controller 16 must first open valve (v6) 98, close valve (v5) 64d and turn on pump (p4) 66d until a tank level empty (tse) is indicated for tank (t5) 90. Once the +5 volt signal has been sensed from the (tse) sensor 100, valve (v6) 98 is closed and valve (v5) 64d is opened. During this cycle, product is first transferred from tank (t3) 50d to the target tank 20. The controller 16 will turn on pump (p4) 66d and open valve (v5) 64d. If additional product is needed to complete the transfer and fill cycle and tank (t3) 50d is empty, the controller 16 will switch operation to tank (t4) 52d by switching valve (v5) 64d to tank (t4) 52d, valve (v4) 58d to tank (t3) 50d, and pump (p3) 54d to be used to refill tank (t3). Using a signal from the appropriate load cell 33, the controller 16 will check the weight of tank (t3) 50d until a full indication has been met, then turn pump (p3) 54d off, while metering the output of tank (t4) 52d. If yet additional product is required to complete the filling of the target tank 20, this step is repeated, toggling between the two tanks 50d, 52d. It should be herein that the use of a pair of tanks 50, 52 described with reference to FIG. 2, and tank pairs 50c, 52c and 50d, 52d may each be replaced by single larger capacity tank. However, the use of tank pairs minimizes the need for the large volume subsystems 12, 14 by toggling between the tanks within the tank pairs. Further, it should be appreciated based on the teachings of the present invention, that the tank pairs in combination with the associated load cells combine to provide a measure of flow and flow rate. Alternatively, flow meters may be used.

In the mixing cycle of the embodiment of the system 11 herein described by way of example, the controller 16 controls the mixing ratio of pump (p2) 66c and pump (P4) 66d with the output going through a mechanical mixer (m1) 104 through additional valves and hose 28, which hose is conveniently carried on a reel 80, as earlier described with reference to FIG. 2, and out to the target tank 20.

Again, if an emergency condition exists, pressing the large red emergency stop button 30 illustrated with reference again to FIGS. 1 and 4, will immediately close valve (v7) 106 positioned intermediate to the mixer 104 and target tank 20, as illustrated in FIG. 3. In addition, the system operation will be turned off. In order to restart the system, the emergency stop button 30 must be manually reset as is indicated by an automatically displayed message from the controller 16.

The system 11, as performed by the controller 16, will transfer a predetermined and pre-programmed quantity of product to the target tank 20. If the target tank 20 becomes full before the pre-programmed amount has been reached, pressure in target tank 20 will be sensed by a pressure sensing switch (pss1) 108 communicating with the controller 16 indicating that pumps (p2 and p4) 66c, 66d need to be turned off, valve (v7) 106 is to be closed. Preferably, when filling within approximately 2 gallons of the pre-programmed amount, the controller 16 will taper (slow down) the flow rates and thus outputs of pumps (p2 and p4) 66c, 66d until the desired amount is reached.

During the filling operation, vapor from the target tank 20 is transferred back to the source tank 18 to keep the system 11 closed to the surrounding environment. Venting the vapor back to the source tank 18 is accomplished by monitoring pressure in the source tank using the pressure sensing switch (pss2) 110 until reaching approximately 3 to 5 PSI, which will supply a +5 volt signal to the controller 16, resulting in the controller in turn closing solenoid valve (v10) 112 to divert vapor through a carbon filter 114, and out to the surrounding environment if appropriate for the chemical materials being transferred.

Once the transfer operation is completed, it is desirable to drain the hose 28. Upon completion of the filling of the target tank 20, the controller 16 will display a message such as "do you want to fill another tank". If the answer is "no," the controller will display a message to disconnect the connectors (mm3) 22, 26 from the target tank 20, retract the hose 28 onto the reel 80 and connect the hose connector 26 to the receptacle/connector (mm2) 60. If the answer is "yes," the controller 16 will display a message to disconnect (mm3) 22, 26 from the target tank 20, retract the hose 28 onto the reel 80 to prevent damage to hose and connector, and do not reconnect to (mm2) 60. This will leave the lines of the system 11 wet for filling additional tanks.

Figure 3A:
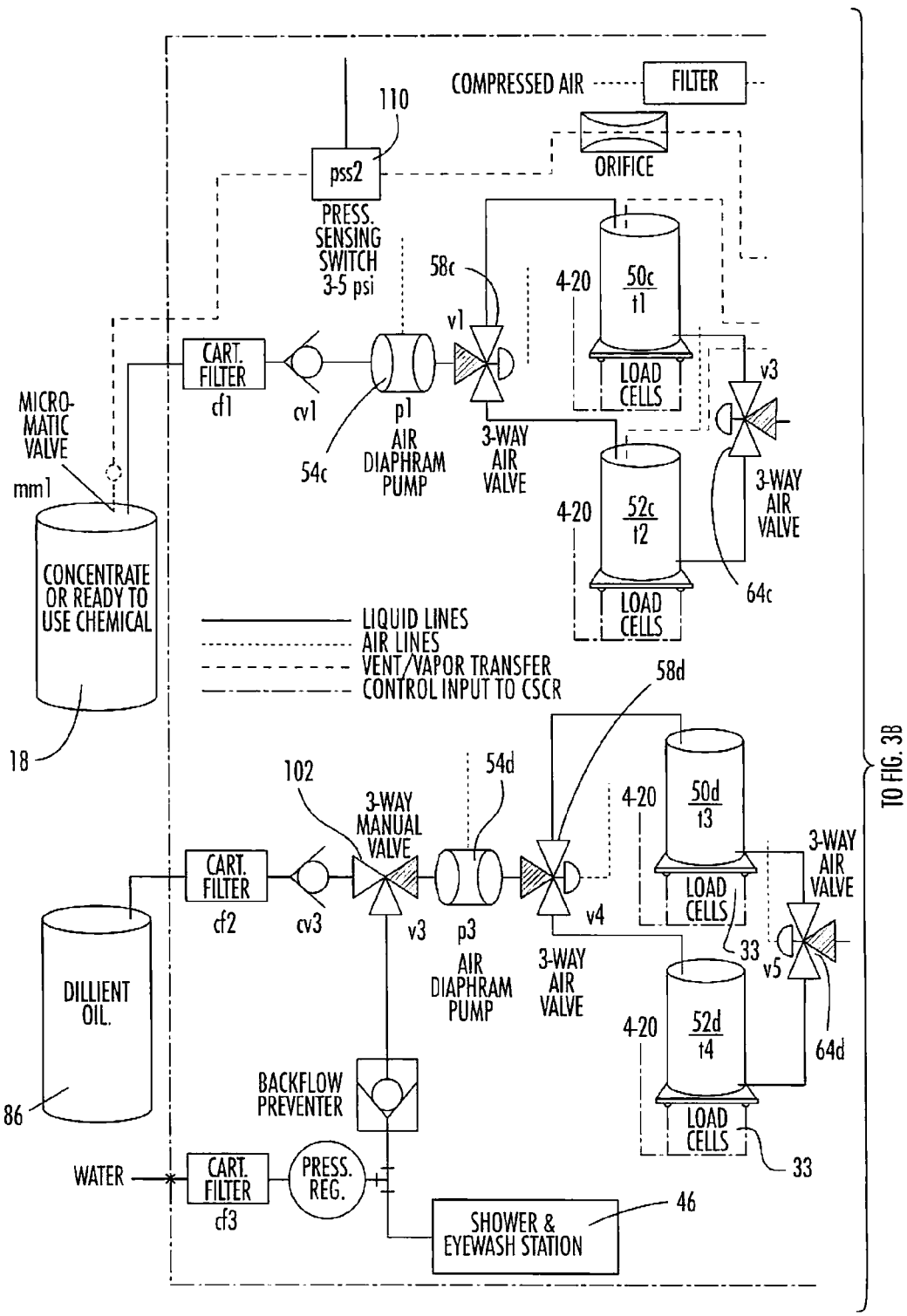
FIGS. 3A, 3B, and 3C present a block diagram of an embodiment of the present invention illustrating elements used for mixing and transfer of multiple chemicals from source to target tanks.
Figure 3B:
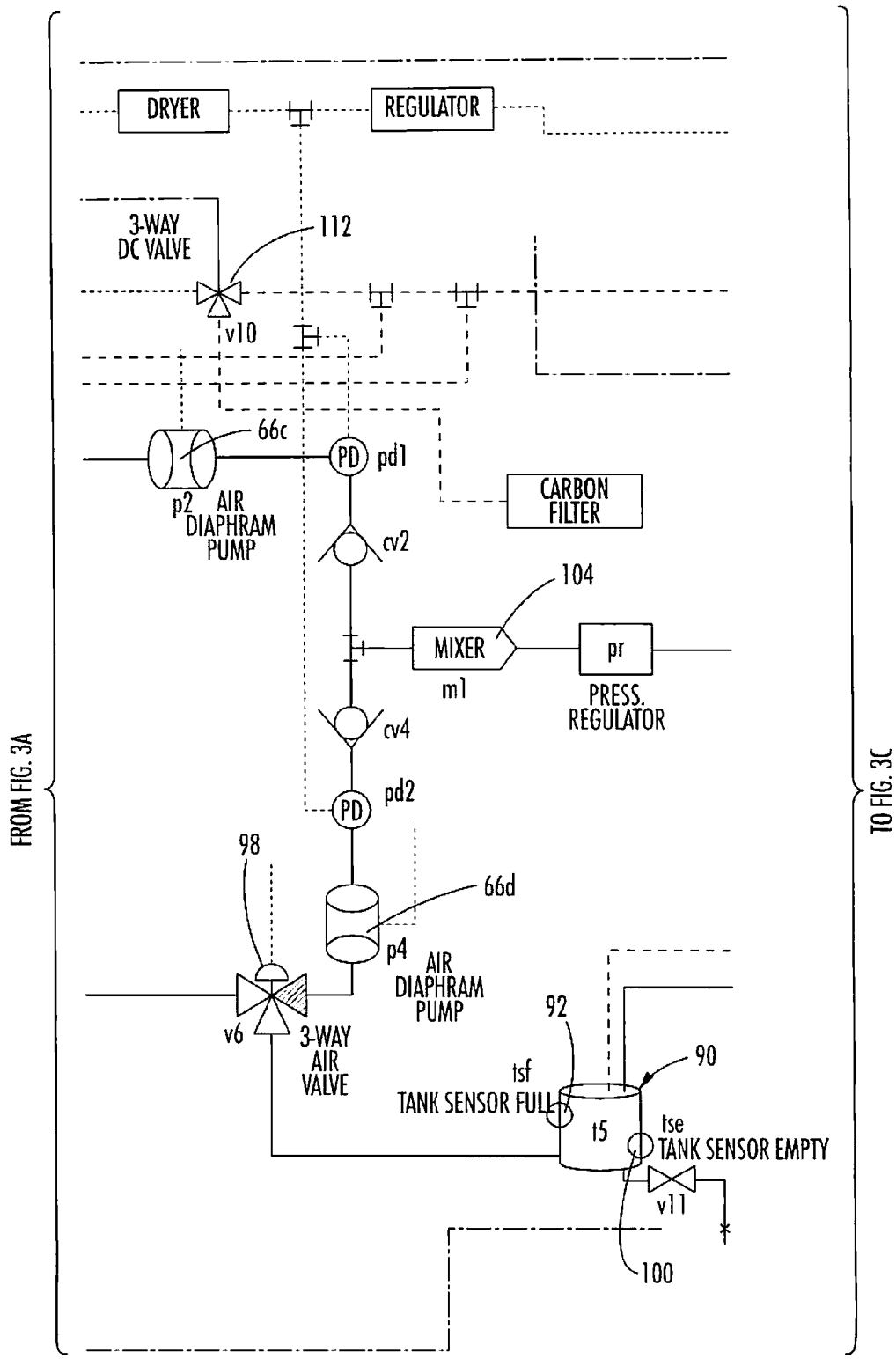
Figure 3C:
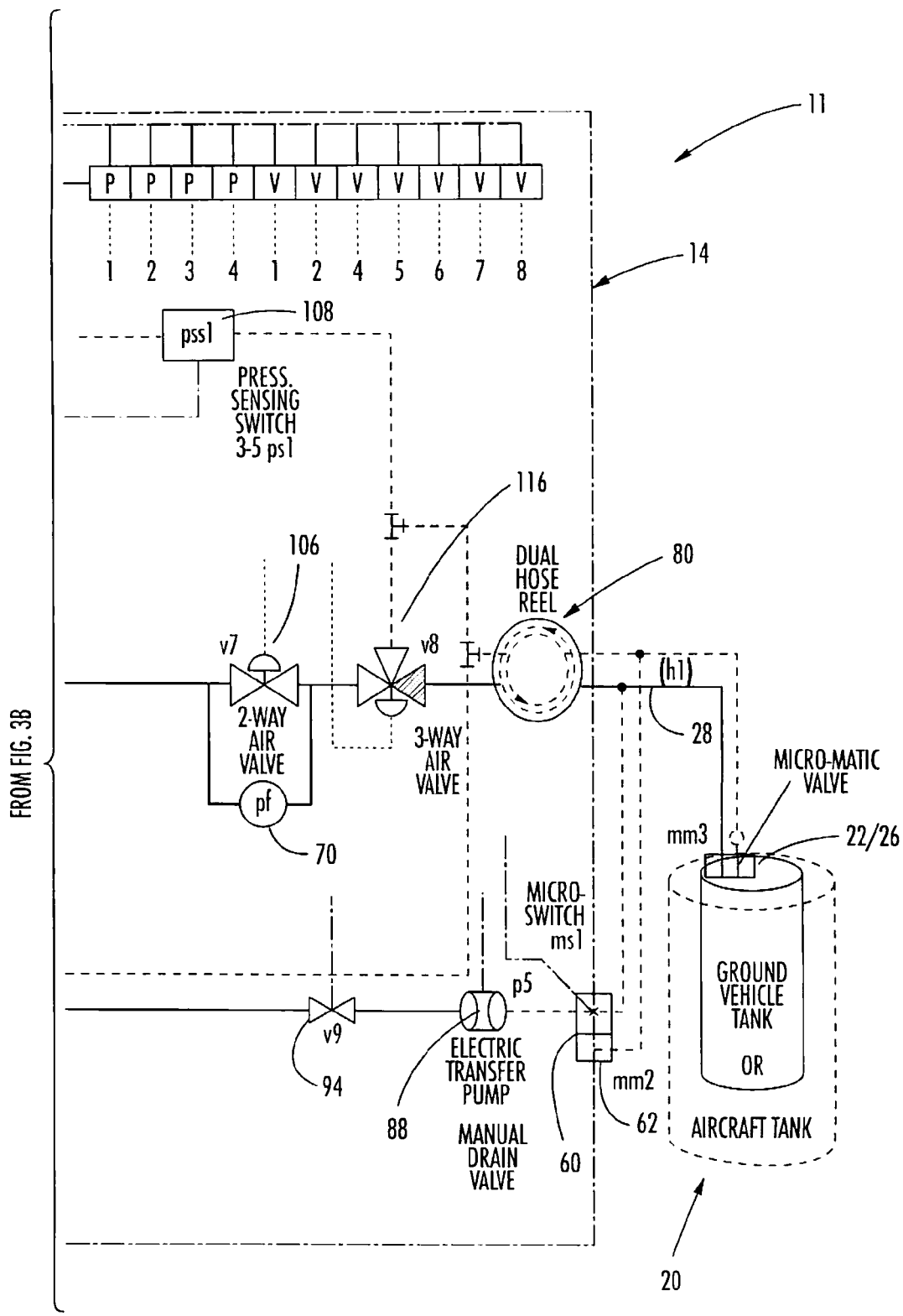

With continued reference to FIGS. 3A, 3B, and 3C, when connecting to receptacle/connector (mm2) 60 after filling has completed, the controller 16 receives a sensed signal from the micro switch (ms1) 62 indicating a closure and that the hose (h1) 28 is connected to the system 11. The controller 16 will then open a three-way valve (v8) 116 located inline between the two-way valve (v7) 106 and the exit portion of the hose 28, close valve (v7) 106 and turn on pump (p5) 88. This sequence will continue until the tank empty sensor (tse) 100 indicates a condition other than empty, plus a predetermined time, but not a full indication signaled by the sensor (tsf) 92.

The last sequence to be performed will be to fill tanks (t1 & t2) 50c, 52c, and (t3 & t4) 50d, 52d if applicable. After this final sequence is complete, the processor 17 (TDS2020) as earlier described with reference to FIGS. 1 and 4 will place the system into a "sleep mode" after a predetermined time period.

Figure 5:
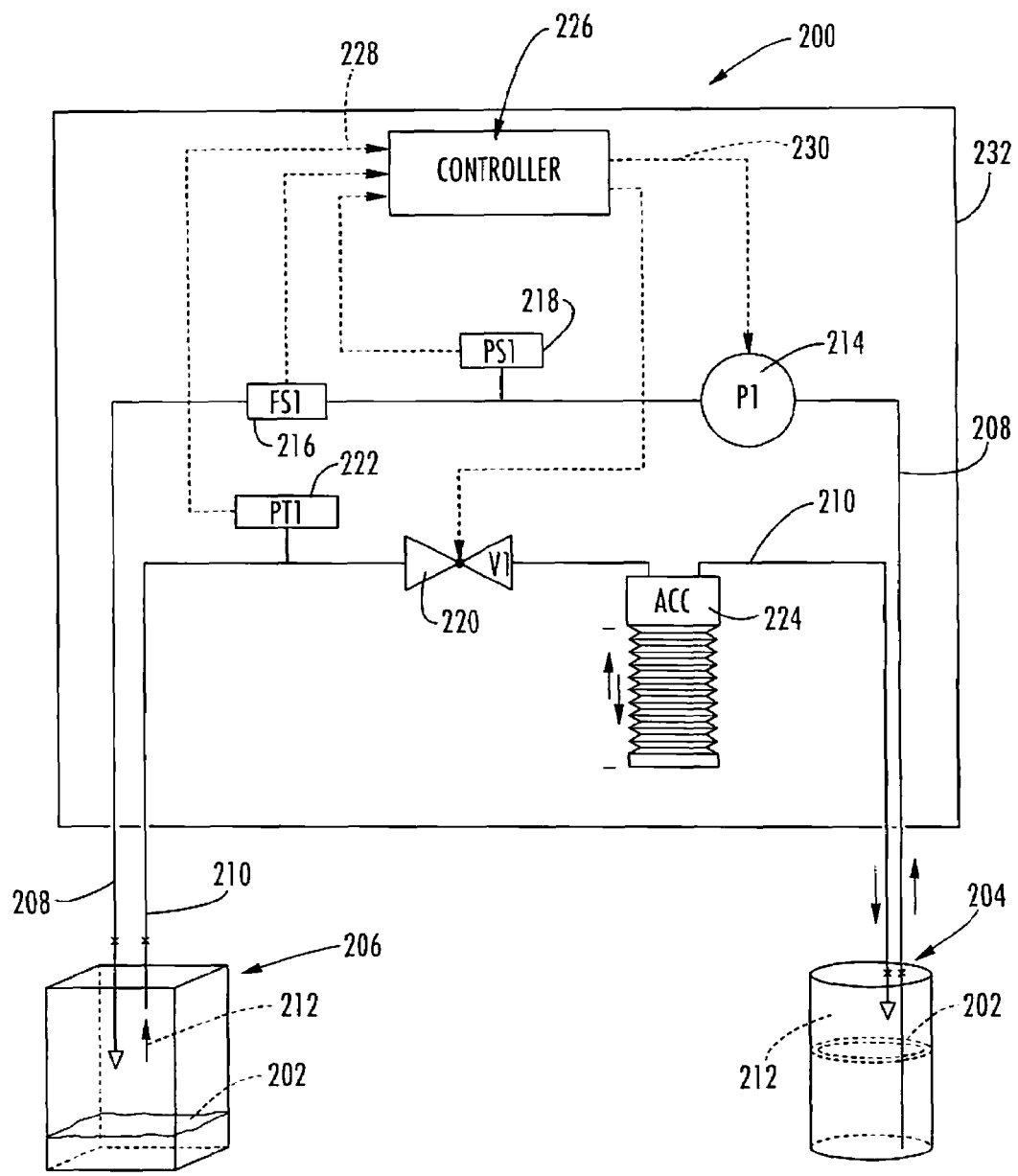
FIG. 5 is a block diagram illustrating an alternate embodiment of the present invention including an accumulator carried within a vapor line connected between source and target storage containers.

With reference now to FIG. 5, one embodiment of the present invention includes a hazardous fluid transfer system 200 for transferring a hazardous liquid 202, such as an insecticide, and transfers the liquid within a closed environment. The system 200 as herein described by way of example, includes a source storage container 204 for carrying the hazardous liquid 202 in preparation for transferring to a target storage container 206. A liquid conduit 208 is connected between the source storage container 204 and the target storage container 206 for delivering the liquid from the source storage container 204 to the target storage container 206. In addition, a vapor conduit 210 is connected between the source storage container 204 and the target storage container 206 for delivering vapor 212 from the target storage container 206 back to the source storage container 204. The returning vapor is within the segregated conduit 210 during delivery between the source storage and the target storage containers. With continued reference to FIG. 5, a pump 214 is operable within the liquid conduit 208 for pumping the liquid 202 from the source storage container 204 to the target storage container 206. A flow sensor 216 is operable with the liquid conduit 208 for monitoring flow therein. A first pressure sensor 218 is also operable with the liquid conduit for monitoring pressure therein. The pressure sensor and the flow sensor 216 are positioned between the pump 214 and the target storage container 206, for the embodiment herein described by way of example. A two-way valve 220 is connected within the vapor conduit 210 and actuated for controlling a flow of vapor 212 through the vapor conduit. A second pressure sensor 222 monitors pressure within the vapor conduit 210 and, for the embodiment herein described, is located between the valve 220 and the target storage container 206. An expandable container, herein referred to as an accumulator 224 is operable with the vapor conduit 210 and is connected to the vapor conduit between the valve 220 and the source storage container 204 for accumulating vapor during periods when the valve is in on open position and allowing the vapor to flow from the accumulator into the source storage container 204 during periods when the valve is in a closed position, such as during periods when the liquid 202 is being pumped from the source storage container 204. For the embodiment herein described, by way of example, the accumulator 224 is a flexible bellows styled container having a variable volume.

A programmable controller 226 is operable within the system 200 for receiving input signals 228 from the sensors 216, 218, 222 and providing output signals 230 for automatically actuating the pump 214 is response to a monitored pressure within the liquid conduit 208 and automatically actuating the valve 220 in response to a preselected pressure level established for the target storage container 206, as will be further detailed later in this section.

Figure 6:
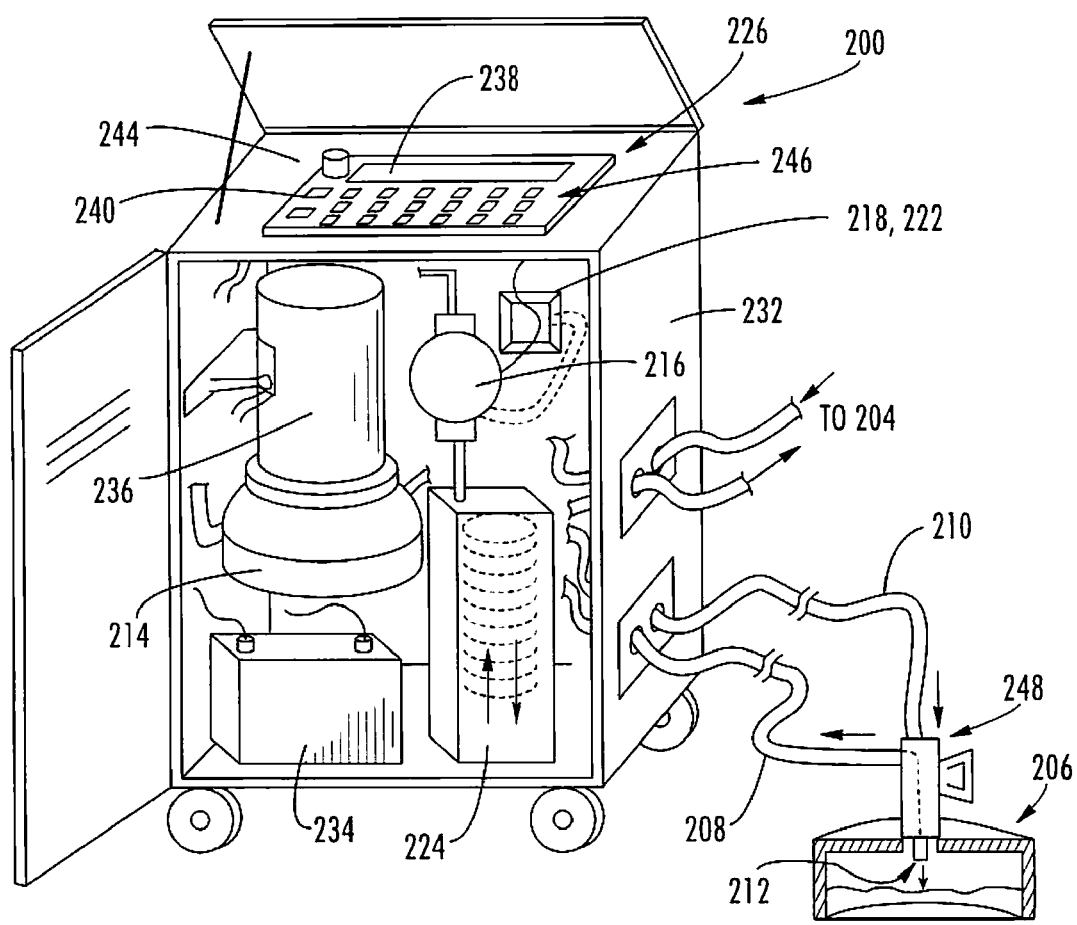
FIG. 6 is a partial perspective view of one mobile embodiment of the present invention.

As illustrated with reference to FIG. 6, one embodiment of the system 200 may include a housing 230 that carries the controller 226, the pump 214, the accumulator 224, the valve 220, and the sensors 216, 218, 222. As will come to the mind of those skilled in the art, now having the benefit of the teachings of the present invention, support equipment, such as a battery power source 234 for powering a motor 236 for the pump 214, may also be carried by the housing 232. Further, the controller 226 my have a monitor 238 and keyboard styled data entry 240, and power conversion equipment as may be needed to power the controller. For the embodiment herein described by way of example, the housing 232 is mobilized for manual movement using wheels 242.

By way of example with regard to operation of the system 200, reference is again made to FIGS. 5 and 6. The system may be located at a transport vehicle, such as a truck, an aircraft, and the like, for delivering an insecticide. Power is off. To transfer the insecticide (the liquid 202) an operator of the system 200 may perform the following steps:

Step 1. The operator unlocks an emergency stop switch 244 located on the control panel 246 with an appropriate key. A counter clockwise twist will unlatch the switch 244 and apply power to the system 200 from the battery source 234.

Step 2. On a power up sequence, the pressure sensor 218, a switch PS1, is open (with a signal of 0-volts for open, and a signal of +5 volts for closed) sending a 0 volt signal to the closed system controller 226. The valve 220 (V1) is closed.

Step 3. The operator may then initiate a "fill" request by pressing an "act key" on the keyboard 240. This may be in response to a menu viewed on the monitor 238 for making a data entry (e.g. 1) for "START NEW TRANSFER". The operator may have the option of entering data via the keyboard 240, with an option of entering any new information pertinent to the transfer such as: Aircraft number; Location; Operators name; and Chemical type, by way of example.

Step 4. The operator may then enter a type of transfer, either a "TRANSFER ALL" or a "METERED TRANSFER", by way of example. A Transfer All simply transfers the liquid 202 from the source storage container 204 to the target storage container 206 until either the source container is empty or the target container is full. A Metered Transfer selection may transfer only a preprogrammed amount into the target container 206.

Step 5. When the type of transfer is selected, the monitor 238 may display CONNECT SUCTION HOSE TO DRUM AND DISCHARGE HOSE TO TARGET. CONNECT VENT HOSE TO TARGET. PRESS THE START BUTTON WHEN READY. To continue with the example, the operator presses "start". The pump 214 may be stopped at anytime during fill by simply pressing a "stop" button on the keyboard 240, or the stop switch 244.

Step 6. The controller 226 CPU will then turn pump 214 P1 on and monitor the status of the first pressure sensor 218 PS1. By way of example, if a signal value is at 0-volts, continue the fill; if at +5-volts, turn off the pump 214 indicating that the hose has not been connected to the target container 206.

Step 7. With the pump 214 P1 running, the controller (CPU) 226 monitors pressure, 0-5 volts from the second pressure sensor 222 PT1 for a predetermined (X) amount of time. After X time, the controller 226 may be programmed to open the valve 220 V1 to discharge pressure back an atmospheric level, by way of example. If no pressure is measured during this sequence, the controller 226 will turn the pump 214 P1 off indicating, by way of example, that the vapor conduit 210 (a vent hose) has not been connected at a nozzle assembly 248, by way of example with reference again to FIG. 6.

Figure 7C:
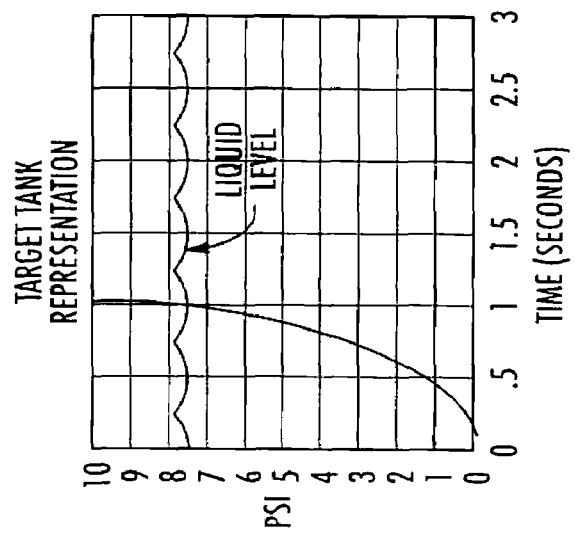
FIGS. 7A, 7B, and 7C include pressure versus time responses for a target tank having various liquid levels.
Figure 7B:
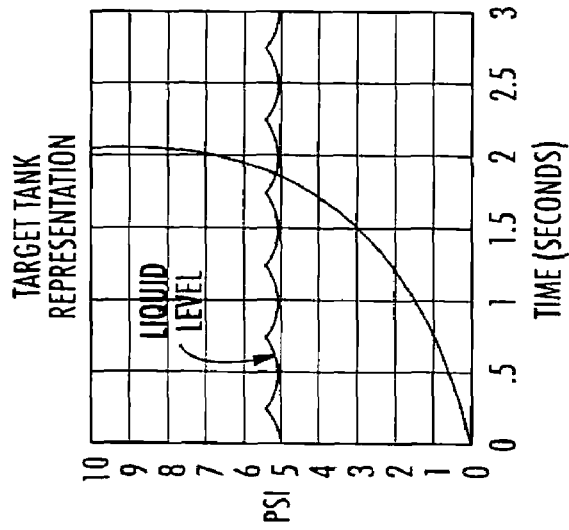
Figure 7A:
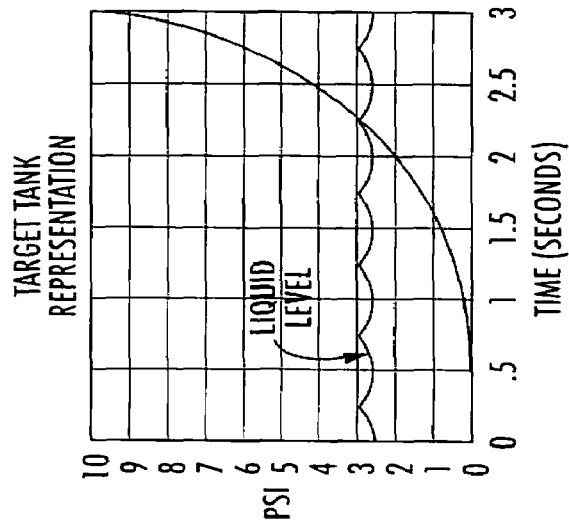

Step 8. When it is determined by the controller 226 that the pressure in the vapor conduit 210 as determined by the second pressure sensor 222 PT1 is at an atmospheric pressure once again, Step 7 is repeated each time looking at pressure vs. time until reaching a preset or preselected value. Such a pressure measuring sequence is monitored (by the controller 226) throughout the fill process. If the target container 206 is filled to capacity, the pressure vs. time response preset will indicate when the target container is full and the controller 226 will shut off the pump 214. By way of example for pressure responses, reference is made to FIGS. 7A, 7B, and 7c, plots of pressure vs. time responses are presented as examples at various fill levels for the target container 206.

Step 9. During the transfer of the liquid 202 from the source container 204 to the target container 206, (Steps 6-8), as the valve 220 V1 opens, the accumulator 224 expands allowing vented vapors to flow from the target container to the accumulator, filling the accumulator. When the valve 220 V1 is closed, the accumulator 224 retracts providing sufficient vapor flow to the source container 204 to prevent collapse while at the same time capturing the vapor within the source container. This sequence may be repeated continuously or intermittently during a liquid transfer from the source container to the target container.

Step 10. By way of further example, if a METERED TRANSFER is selected, the controller 226 may be programmed to control operation of the pump 214 for transferring the liquid 202 (an insecticide, by way of example) at a preprogrammed rate until reaching a preselected stop (one half gallon less than desired), at which time the controller may slow down operation the pump 214 to a lesser rate, such as a 2 GPM rate, until reaching the final metered amount.

Step 11. During both the METERED and TRANSFER ALL options, the pump 214 will run until the flow sensor 216 stops sending a signal to the controller 226 indicating that the source container 204 is empty. By way of further example, since a typical aircraft insecticide tank (the target container 206) filling process will involve more than one drum (source container 204), the closed system controller 226 may indicate on the display monitor 238 that it is time to change a suction hose connection, such as the nozzle assembly 248 illustrated by way of example with reference again to FIG. 6, at the source container 204 to a new drum (another source container 204) and press the start button to continue.

By way of further example, pressing the an actuation key on the keyboard 240 may bring up the following options as a result of a preprogrammed controller 226: START NEW TRANSFER; STOP TRANSFER, DATA; CALIBRATION; REPORT/ERASE DATA; and the like.

As earlier described, START NEW TRANSFER may the beginning of a transfer and the beginning of data collection for that fill sequence. By way of example, STOP TRANSFER, DATA is not herein described for turning off the pump 214, but for a point at which data collection stops.

CALIBRATION may be selected to change calibration on certain data fields and to calibrate pump performance. This section may be password protected to prevent changes to the controller programming without authorization. By way of example, the following fields may be included in CALIBRATION: DATE/TIME; AIRCRAFT; PUMP; OPERATOR; AREA; FLOW RATE (GPM); and PASSWORD.

The DATE/TIME may calibrated based on local time and this data and all other calibration data may be held in memory by a battery backed RAM. AIRCRAFT may include the tail number or general description of the aircraft being filled with insecticide. If there is more than one aircraft, this information may be changed during each "START NEW TRANSFER" sequence. PUMP—Calibration of the pump may be performed periodically and be based on a full 30-gallon drum of insecticide, by way of example. As a result, the operator must insure that the amount of chemical (liquid 202) being transferred during the pump calibration is 30 gallons or a full sealed drum of chemical. OPERATOR—If the same operator performs the fill sequences each time, if is only necessary to enter this data field once. AREA may be a data field for tracking where the aircraft has sprayed. FLOW RATE may be used for selecting how fast the chemical is to be transferred. By way of example, the operator may choose 5, 6, 7, 10, or a desired gallons per minute fill rate that is within allowable limits. By way of example, PASSWORD may include: Default as a password set by the manufacture and will always be the same; Programmed as a password defined by the end user.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

That which is claimed is:

1. A hazardous fluid transfer system for transferring fluid within a closed environment, the system comprising:
   a source storage container for carrying a hazardous liquid therein;
   a target storage container for receiving the hazardous liquid;
   a liquid conduit communicating between the source storage container and the target storage container for delivering a liquid therebetween;
   a vapor conduit communicating between the source storage container and the target storage container for delivering a vapor therebetween;

a pump operable with the liquid conduit for pumping the liquid from the source storage container to the target storage container during actuation thereof;
a flow sensor operable for monitoring flow in the liquid conduit;
a first pressure sensor operable for monitoring pressure within the liquid conduit;
a valve operable with the vapor conduit for controlling vapor flow therethrough;
a second pressure sensor operable with the vapor conduit for monitoring pressure therein;
a vapor accumulator operable with the vapor conduit between the valve and the source container for accumulating vapor therein during periods when the valve is in an open position and allowing the accumulated vapor therein to flow into the source container during periods when the valve is in a closed position; and
a controller operable for receiving input signals from the sensors and automatically actuating the pump responsive thereto.

2. A system according to claim 1, wherein the liquid conduit and the vapor conduit segregate the liquid and the vapor during fluid flow between the source storage and the target storage containers.

3. A system according to claim 1, wherein the first pressure sensor monitors pressure within the liquid conduit between the pump and the target storage container.

4. A system according to claim 1, wherein the valve is carried within the vapor line between the target container and the accumulator.

5. A system according to claim 1, wherein the valve is a two-way valve.

6. A system according to claim 1, wherein the second pressure sensor is operable between the valve and the target storage container.

7. A system according to claim 1, wherein the controller is responsive to pressure within the liquid conduit for automatically actuating the valve at a preselected pressure level established for the target storage container.

8. A system according to claim 7, wherein the preselected pressure level comprises a pressure versus time response, and wherein the controller monitors the response for determining a liquid level within the target container.

9. A system according to claim 1, further comprising a housing, and wherein the housing carries the pump, the accumulator, the valve, and the sensors.

10. A system according to claim 1, wherein the accumulator is a bellows styled container having a variable volume.

11. A hazardous fluid transfer system for transferring fluid within a closed environment, the system comprising:
a liquid conduit for providing a sealed connection between a source storage container and a target storage container for transferring a liquid therebetween;
a vapor conduit for providing a sealed connection between the source storage container and the target storage container for transferring a vapor therebetween;
a pump operable for pumping the liquid through the liquid conduit;
a flow sensor for monitoring a liquid flow within the liquid conduit;
a pressure sensor for monitoring pressure within the target storage container;
a valve operable with the vapor conduit for controlling vapor flow therethrough;
a vapor accumulator operable with the vapor conduit between the valve and the source storage container for accumulating vapor therein during periods when the valve is in on open position and allowing the vapor in the accumulator to flow into the source storage container during periods when the valve is in a closed position and liquid is being pumped through the liquid conduit; and
a controller for actuating the pump and the valve responsive to pressure within the target storage container.

12. A system according to claim 11, further comprising a source storage container and a target storage container.

13. A system according to claim 12, wherein the liquid and the vapor are segregated during delivery between the source storage container and the target storage container.

14. A system according to claim 11, wherein the pressure sensor comprises at least one of a first pressure sensor operable within the liquid conduit and a second pressure sensor operable within the vapor conduit.

15. A system according to claim 11, wherein the controller is automated for receiving input signals from the sensors and automatically actuating the pump and valve responsive to at least one of a preselected pressure level established for the target storage container and liquid flow.

16. A hazardous fluid transfer system comprising:
a liquid conduit for communicating between a source storage container and a target storage container for delivering a hazardous liquid therebetween;
a vapor conduit for communicating between the source storage container and the target storage container for delivering a vapor therebetween, wherein the liquid and the vapor are segregated during delivery between the source storage and the target storage containers;
a pump for transferring the liquid from the source storage container to the target storage container through the liquid conduit;
a first pressure sensor for monitoring pressure within the liquid conduit;
a valve operable for controlling vapor flow through the vapor conduit;
a second pressure sensor for monitoring pressure within the vapor conduit; and
a vapor accumulator operable with the vapor conduit for accumulating vapor during periods when the valve is in an open position and allowing the accumulated vapor to flow into the source storage container during periods when the valve is in a closed position.

17. A system according to claim 16, further comprising a controller operable for actuating the pump in response to pressure within the liquid conduit and automatically actuating the valve responsive to a preselected pressure level.

18. A system according to claim 16, further comprising a source storage container for carrying a hazardous fluid therein and a target storage container for receiving the hazardous fluid.

19. A system according to claim 16, further comprising a flow sensor for monitoring flow through the liquid conduit.

20. A system according to claim 16, wherein the first pressure sensor is operable downstream of the pump.

21. A system according to claim 16, wherein the second pressure sensor is operable between the valve and the target storage container.

22. A system according to claim 16, wherein the accumulator is operable with the vapor conduit between the valve and the source storage container.

23. A system according to claim 16, wherein the accumulator is a bellows styled container having a variable volume.

24. A system according to claim 16, wherein the liquid is an insecticide.

* * * * *